M. MURRAY.
ELECTRIC BOX.
APPLICATION FILED MAY 31, 1910.
1,066,215.
Patented July 1, 1913.
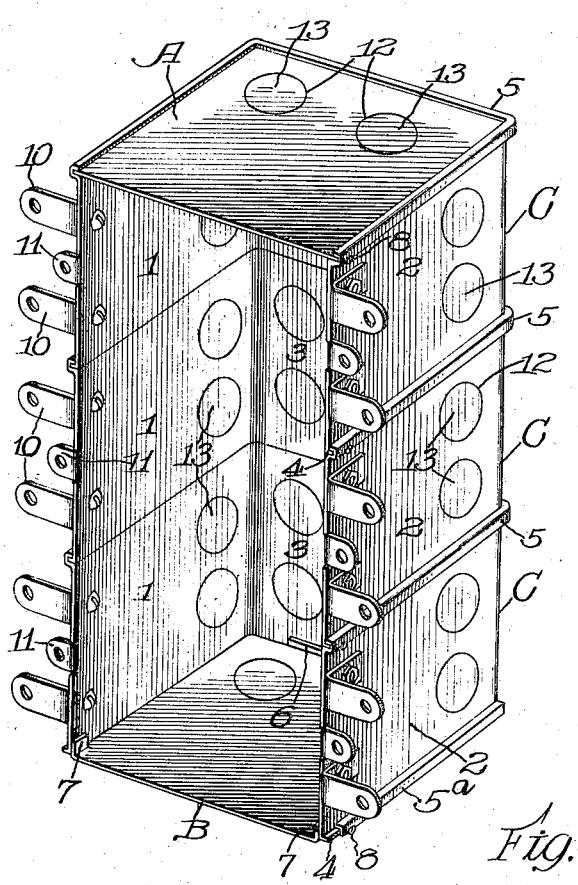
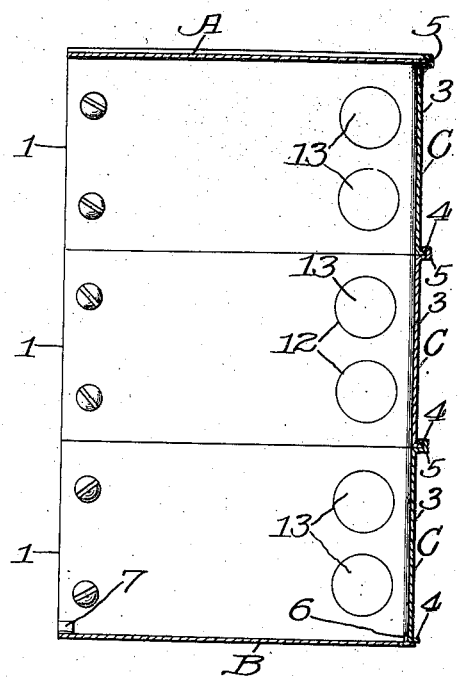
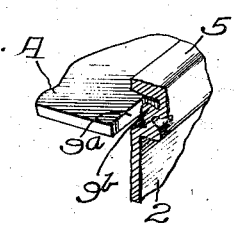
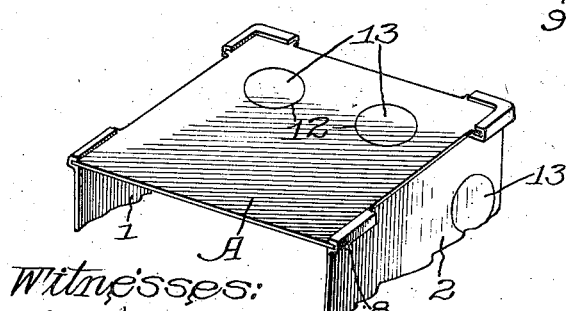
Witnesses:
G. A. Wauberschmidt
George L. Churdahl
Inventor:
Michael Murray
By Luther L. Miller
Atty.

UNITED STATES PATENT OFFICE.

MICHAEL MURRAY, OF CHICAGO, ILLINOIS, ASSIGNOR TO CHICAGO FUSE MANUFACTURING COMPANY, OF CHICAGO, ILLINOIS, A CORPORATION OF ILLINOIS.

ELECTRIC BOX.

1,066,215.  Specification of Letters Patent.  Patented July 1, 1913.

Application filed May 31, 1910. Serial No. 564,084.

*To all whom it may concern:*

Be it known that I, MICHAEL MURRAY, a citizen of the United States, residing at Chicago, in the county of Cook and State of Illinois, have invented certain new and useful Improvements in Electric Boxes, of which the following is a specification.

This invention relates to boxes intended to be placed in walls, floors, ceilings, and other places, and intended to contain switches, fuse blocks, or other electrical appliances.

The invention relates particularly to that type of electric box which is made in sections so that boxes of desired dimensions may be built up by the workmen installing the boxes in the building.

One of the objects of the invention is to produce an improved form of connection between the sections of sectional electric boxes.

Another object of the invention is to section the boxes in such a way as to facilitate the building up of boxes by the workmen and so as to reduce the number of sections which a dealer must carry in stock.

In the accompanying drawings, Figure 1 is a perspective view of a sectional electric box embodying the features of my invention. Fig. 2 is a longitudinal central section through the box. Fig. 3 is a fragmental perspective view, showing an alternative construction. Fig. 4 is a perspective view illustrating one means for locking the sections together. Fig. 5 represents an alternative way of securing the sections together.

The box herein shown comprises opposite end walls A and B and one or more unit body-sections C. Each body-section consists of two side walls 1 and 2 and a rear wall 3. Preferably, although not necessarily, each body-section is stamped from a single piece of sheet metal, the three walls of each body-section being, therefore, integral.

The sections of the box are connected together by tongue-and-groove joints. The tongues and grooves may extend throughout the length of the walls in or upon which they are formed, as shown in Fig. 1, or they may be relatively short, as indicated in Fig. 3. Upon one end of each body-section C are formed tongues 4 and upon the opposite end of each body-section are formed grooves 5 to receive the tongues 4 upon an adjacent section. Preferably the tongues and grooves are formed upon all of the walls of each body-section, as shown. In this instance the tongues 4 are formed by bending the sheet metal outwardly in the form of flanges extending at right angles with the planes of the walls, and the grooves are formed by bending the sheet metal of the walls into concave or hollow beads, as shown in the drawings, said grooved portions being located in position to receive the tongues upon an adjacent section.

The end wall A in the form herein shown is a simple oblong piece of sheet metal, three of the edge portions of which constitute tongues adapted to enter grooves 5 of any body-section. The end wall B, in this instance, has upon its side edges grooved portions 5ª to receive tongues 4 upon any body-section. The rear edge of the end wall B has no groove therein. In order to form a stop to determine the operative position of the end wall B with relation to the body section with which it is connected, any suitable means may be provided, such as a stop flange 6 formed on the inner side of the rear edge of the end wall, which stop flange is arranged to lie against the inner side of the rear wall of the body-section with which the end wall is engaged.

I have provided means for preventing displacement of the side walls of the box in an inward direction. Said means, in this instance, consists of two inwardly-extending stop lugs 7 formed on the end wall B, said stop lugs being positioned to lie at the inner faces of the side walls of the body-section with which said end wall is engaged. It will be seen that said stop lugs effectively prevent springing of the side walls of that section in an inward direction. The end wall A, lying between the opposite grooved portions of a body-section, prevents inward displacement of the side walls of that body-section. The side walls of that section in turn serve to prevent inward displacement of the side walls of the next succeeding body-section.

If desired, means may be provided for locking the sections together. Any suitable means may be utilized for this purpose. That shown in Figs. 1 and 4 consists of a screw 8 seated in the groove portion of one or both of the side walls of each body-section, and one or both grooved portions on the end wall B, the inner ends of each screw being arranged to project into the groove and thus obstruct a withdrawing movement of the flange lying in said groove. Each flange is notched as at 9 (Fig. 4) to accommodate the projecting inner end of the screw. When the sections are to be connected together, the screws are turned until their inner ends do not obstruct the grooves, but without withdrawing the screws from the box sections. The flanges are then slid into the grooves and the screws turned until their inner ends lie within the notches 9.

An alternative method of locking the sections together is illustrated in Fig. 5. The tongue may have a notch 9ª therein, and the grooved portion may be dented, as at 9ᵇ, to enter into said notch.

The box may be secured in place by any common or preferred means, as, for example, by means of screws engaging perforated lugs 10 attached to the outer faces of the side walls of the body sections.

The cover or face plate, which usually carries a switch, fuse block, or other appliance to be inclosed, may be secured to the forward side of the box in any suitable manner, as, for example, by means of screws entering angular outwardly-extending ears 11 on the side walls of the body sections C.

Electric wires, cables or conduits may be inserted into the box through openings 12 formed at convenient points in the various sections of the box, said openings being closed by plugs 13 until needed.

It will be seen that the box consists of two end walls and any desired number of body-sections, all of which body-sections are alike in form and construction. Therefore a workman supplied with a quantity of end walls A and B and body-sections C may connect up any of said body-sections to the end walls to form any size of box he may require. It will also be seen that the dealer can supply demands from a relatively small stock because of the practicability of using any body-section in building up the smallest as well as the largest box.

The tongue-and-groove connection between the sections is one requiring a minimum amount of time in building up a box, and is strong and simple in construction.

I claim as my invention:

1. A body section for sectional electric switch boxes comprising two side walls and a third wall formed from an integral piece of sheet metal, said body section having at one end tongues bent outwardly from the edges of its walls, said tongues running lengthwise along said edges and lying at right angles with their walls, said body section having the edges of its walls at the other end of the section bent to form inwardly facing grooves.

2. A sectional electric switch box comprising an integral U-shaped body section formed of sheet metal, one end of said section having tongues bent outwardly from the edges of its walls, said tongues running lengthwise along said edges and lying at right angles with their walls, and an end wall having its edges bent to form U-shape grooves disposed with the base of the U outwardly, said end wall being adapted to be slid into position to close one end of said body section.

3. In a sectional electric box, in combination, a body section consisting of two side walls and a rear wall; an end wall having a tongue-and-groove connection with one end of said body section, said end wall having inwardly-extending lugs thereon adapted to lie at the inner faces of said side walls to prevent inward displacement of said walls; and means for closing the other end of said body section.

4. A sectional switch box comprising a section having the edges of its walls at one end of the section bent to form U-shaped grooves disposed with the base of the U outwardly, and a section having tongues adapted to be slid lengthwise into said grooves, each of said tongues having a notch therein and a member carried by each groove and arranged to extend inwardly into said groove and lie in the notch in said tongue for preventing withdrawal of the tongues from the grooves.

5. A sectional electric box comprising a body section consisting of two side walls and a rear wall, an end wall having a tongue and groove connection at its side edges with the side walls of the body section, the rear edge of said end wall under-lying the rear wall of said body section; and a flange on the rear end of said end wall adapted to engage the inner side of said rear wall, said flange determining the operative position of the end wall with relation to the body section.

6. In a sectional electric box, in combination, a body section consisting of two side walls and a rear wall, said section having at one end tongues formed on the edges of said walls, and at its other end grooved portions formed on the edges of said walls; an end wall the edges of which are adapted to enter said grooved portions; an end wall having grooved portions at its side edges to receive the tongues on the side walls of the body section, the last mentioned end wall having inwardly-extending lugs adapted to lie at the inner faces of said side walls to prevent inward displacement of said side walls, said last mentioned end wall also having an inwardly-extending stop on its rear edge to engage the rear wall of the body section to determine the operative position of said end wall; and means for locking the sections together.

7. In a sectional electric box in combination, a body section consisting of two side walls and a rear wall, said section having at one end tongues formed on the edges of said walls and at its other end grooved portions formed on the edges of said walls; an end wall the edges of which are adapted to enter said grooved portions; and an end wall having grooved portions at its side edges to receive the tongues on the side walls of the body section.

8. An electric box comprising a plurality of sections each section having tongues bent outwardly from the edge of its wall at one end of the section and having the edges of its walls at the other end of the section bent to form grooves the tongues of one section being slidable longitudinally into the grooves of the next section in assembling the box; an end wall the edges of which are adapted to enter the grooves upon one end section of the box; and an end wall having its edges bent to form grooves adapted to receive the tongues upon the opposite end section of the box.

9. An electric box comprising a plurality of sections each section having an angular tongue at one end and a grooved portion at its other end the tongues of one section being slidable longitudinally into the grooves of the next section in assembling the box, said tongues having recesses therein and screws carried by the sections and extending into said grooves, the inner ends of said screws lying in the recesses of said tongues and preventing movement of the tongues in the grooves.

MICHAEL MURRAY.

Witnesses:
WM. W. MERRILL,
GEORGE C. REID.